United States Patent
Lecoeuche (10) Patent No.: US 8,693,512 B2
(45) Date of Patent: Apr. 8, 2014

(54) FREQUENCY REFERENCING FOR TUNABLE LASERS

(75) Inventor: Vincent Lecoeuche, Tarentaise (FR)

(73) Assignee: JDS Uniphase Corporation, Milpitas, CA (US)

(*) Notice: Subject to any disclaimer, the term of this patent is extended or adjusted under 35 U.S.C. 154(b) by 111 days.

(21) Appl. No.: 13/335,478

(22) Filed: Dec. 22, 2011

(65) Prior Publication Data

US 2013/0163620 A1   Jun. 27, 2013

(51) Int. Cl.
*H01S 3/10* (2006.01)
*H01S 3/30* (2006.01)

(52) U.S. Cl.
USPC .................. 372/20; 372/21; 356/300

(58) Field of Classification Search
USPC .............. 372/20, 21; 356/73.1, 300–303
See application file for complete search history.

(56) References Cited

U.S. PATENT DOCUMENTS

| | | | | |
|---|---|---|---|---|
| 4,914,662 | A | | 4/1990 | Nakatani et al. ............... 372/32 |
| 4,997,277 | A | * | 3/1991 | Horiguchi et al. ........... 356/73.1 |
| 6,134,253 | A | | 10/2000 | Munks et al. .................. 372/32 |
| 6,237,421 | B1 | * | 5/2001 | Li et al. ............................ 73/800 |
| 7,283,216 | B1 | | 10/2007 | Geng et al. ................... 356/35.5 |
| 7,405,820 | B2 | * | 7/2008 | Lopez Torres et al. ....... 356/300 |
| 7,499,151 | B2 | | 3/2009 | Bao et al. ..................... 356/35.5 |
| 7,948,614 | B2 | | 5/2011 | Hotate et al. ................. 356/73.1 |
| 2011/0122417 | A1 | | 5/2011 | Molin et al. .................. 356/478 |
| 2012/0206718 | A1 | * | 8/2012 | Jaaskelainen ............... 356/73.1 |

FOREIGN PATENT DOCUMENTS

JP            01142717       *   6/1989

OTHER PUBLICATIONS

V. Lecoeuche et al. "Non-Intrusive In-Service PMD Measurements: A Novel Approach Based on Coherent Detection," in 37th European Conference and Exposition on Optical Communications, OSA Technical Digest (CD) (Optical Society of America, 2011), paper Th.12.LeCervin.2.

H. Izumita et al, "Brillouin OTDR Employing Optical Frequency Shifter Using Side-Band Generation Technique with High-Speed LN Phase-Modulator", IEEE Photonics Technology Letters, v.8, No. 12, Dec. 1996, p. 1674-1676.

Marc Niklès et al, "Brillouin Gain Spectrum Characterization in Single-Mode Optical Fibers", IEEE Journal of Lightwave Technology, v.15, No. 10, Oct. 1997, p. 1842-1851.

V. Lecoeuche et al, "20-km Distributed Temperature Sensor Based on Spontaneous Brillouin Scattering", IEEE Photonics Technology Letters, vol. 12, No. 10, Oct. 2000, p. 1367-69.

* cited by examiner

*Primary Examiner* — Jessica Stultz
*Assistant Examiner* — Michael Carter
(74) *Attorney, Agent, or Firm* — Matthew A. Pequignot; Pequignot & Myers LLC (57) ABSTRACT

The invention relates to an apparatus and a method for referencing an optical frequency of a tunable laser. Light from a reference laser and the tunable laser is injected into a length of an optical waveguide from opposite ends thereof. When the optical frequency of the tunable laser is swept, SBS induced positive and negative peaks in the optical power of light transmitted through the waveguide are used to provide an accurate frequency change reference.

20 Claims, 7 Drawing Sheets

FREQUENCY REFERENCING FOR TUNABLE LASERS

TECHNICAL FIELD

The present invention relates to frequency tunable lasers, and more particularly to a method and an apparatus for referencing changes in optical frequency of a tunable laser based on stimulated Brillouin scattering (SBS).

BACKGROUND OF THE INVENTION

Broadly tunable lasers are indispensable components of optical test and measurements equipment, as they enable relatively straightforward characterization of spectral properties of various optical devices and spans of optical fiber, such as that employed in fiber-optic communication links. For example, measurements of polarization mode dispersion in deployed fiber and various types of fiber-optic devices typically involves optical frequency sweeping using a tunable laser. One problem that typically arises in such measurements is the determination of the exact laser frequency at various instances during the frequency sweep, or at least an accurate determination of changes in the optical frequency or, which is substantially the same, laser wavelength.

There are known in the art means to reference the optical frequency or wavelength of a tunable laser. For compact tunable lasers that can be used in portable devices, a Fabry-Perot (FP) filter is commonly used for frequency referencing and/or locking, as described, for example, in U.S. Pat. No. 4,914,662 to Mitsubishi. This approach is suitable for laser frequency locking to a static frequency, providing a good absolute frequency referencing for a static-frequency laser. Drawbacks of this approach for frequency referencing during a frequency sweep by a tunable lasers is the large number of indistinguishable resonance peaks provided by an FR resonator, and a relatively large spectral width of each peak; a typical Fabry-Perot would only provide one or two resonances across a 100 GHz frequency span. When used in a static mode, laser locking to an FP etalon typically provides about +/−2.5 GHz absolute wavelength accuracy. A better performance could potentially be obtained in terms of relative wavelength accuracy during a wavelength scan, provided that the FP transmission is finely analyzed with a software fitting routine, possibly improving the wavelength accuracy to about 1 GHz, which still may not be sufficient for many applications. Moreover, for fast laser scans, e.g. as fast as 1 millisecond (ms) duration or faster, it would be preferable to avoid software processing and use an analogue circuit such as a level-crossing scheme for 'on the fly' wavelength referencing.

An external wavemeter, based on the Michelson interferometer, is sometimes used for laboratory instrumentation. This is however a very complex, fragile, and slow equipment, which is unsuitable for field measurements and in the context of portable fiber-optic measurement tools.

A set of tunable filters could also be used for wavelength referencing, as described for example in U.S. Pat. No. 6,134,253 assigned to JDSU. This technique provides however only one wavelength calibration point, may not be sufficiently fast, and may require calibrations that maybe hard to perform in a portable device to a required accuracy.

Alternatively, light from the tunable laser to be referenced may be combined with light of a static, wavelength-stabilized laser, and a high speed photodiode can then be used to determine the resulting beat frequency. In the electrical domain, two relative calibration points could be obtained by monitoring the RF power at a given frequency, anywhere in a range 0-100 GHz with a suitably fast photodiode. This can be done using a narrow, high-frequency filter, and/or a local oscillator for down-conversion in frequency. More calibration points could be obtained using several filters or local oscillators. However, the complexity and cost of this solution could be too high.

U.S. Pat. No. 7,405,820 discloses an optical spectrum analyzing device that utilizes Brillouin scattering in a piece of optical fiber as a filtering mechanism for high-resolution spectral measurements of optical signals.

Brillouin scattering is caused by an interaction of acoustic waves and optical signals. Acoustic waves can cause variations of the density of a medium in which they travel. The density variations can effect optical gratings. Scattering of an electromagnetic wave by such acoustic gratings in an optical medium is known as "Brillouin scattering". The frequency of the scattered electromagnetic wave in the Brillouin scattering is shifted with respect to that of the original electromagnetic wave due to the Doppler effect caused by the motion of the acoustic waves. Depending on the relative directions of the acoustic wave and the electromagnetic wave, the frequency of the scattered electromagnetic wave may be down-shifted to a lower frequency, which is known as "Stokes shift", or a higher frequency, which is known as "anti-Stokes shift".

Stimulated Brillouin scattering (SBS) is a nonlinear optical effect in which the optical pump wave with a higher optical frequency $v_p$ provides optical gain to the counter-propagating optical wave with a lower frequency $v_s$. The effect occurs when the optical frequency difference between the two waves is equal to the so-called Brillouin frequency shift, which is in a typical optical fiber at 1550 nm is about 10.8 GHz. The gain profile of the Brillouin interaction in fibre is lorentzian; at 1550 nm, it has a linewidth of about 30 MHz.

In the device disclosed in U.S. Pat. No. 7,405,820, the signal under investigation is fed into an optical fiber together with a narrowband optical probe signal from a tunable high-coherence laser with a pre-determined wavelength. The probe signal propagates in the opposite direction to that of the analyzed signal, such that both signals interact inside the fiber owing to the Brillouin effect. The Brillouin scattering effect enables a selective, narrow-band optical amplification of a determined component of the optical spectrum of the analyzed signal. The wavelength accuracy of this set-up relies on the wavelength accuracy of the tunable probe laser. In practice, in order to provide high wavelength accuracy, conventional tunable lasers require external wavelength referencing means, such as some combination of a wavemeter, fine-etalon reference and a gas cell for providing an absolute reference point, which leads to a bulky system that is not easily portable.

An object of the present invention is to provide a relatively simple and economical apparatus and method for an accurate optical frequency referencing of a tunable laser that would improve upon at least some of the aforedescribed deficiencies of the prior art, and would be suitable for use in a portable test equipment.

SUMMARY OF THE INVENTION

Accordingly, the present invention relates to an optical frequency referencing device that utilizes SBS interactions of light from a reference laser with light of a tunable laser in an optical waveguide for accurate referencing of an optical frequency of the tunable laser.

One aspect of the present invention provides an optical frequency referencing device, comprising: an optical waveguide having material properties conducive for Brillouin scattering; a tunable laser for launching first light of a tunable frequency into the optical waveguide for propagating therein in a first direction; a reference laser for launching second light of a reference frequency into the optical waveguide in a second direction for counter-propagating therein with the first light and for interacting with the first light by means of stimulated Brillouin scattering (SBS); one or more detectors coupled to the optical waveguide at at least one end thereof for detecting at least one of the first and second light after propagation thereof through the waveguide and for producing at least one electrical signal responsive to changes in optical power thereof; and, a frequency referencing controller (FRC) coupled to the first laser and the one or more detectors and comprising: a tunable laser controller operable to sweep the tunable frequency about the reference frequency in a frequency range exceeding two Brillouin frequency shifts $v_B$ in the optical waveguide, and a signal analyzer for analyzing the one or more electrical signals produced during said sweeping to determine a first value of the tunable frequency at which the first light experiences an SBS induced gain in the optical waveguide, and a second value of the tunable frequency at which the first light experiences an SBS induced loss in the optical waveguide, the first and second values providing a relative frequency reference for the tunable laser.

Another aspect of the present invention relates to a method of frequency referencing for a tunable laser, comprising: launching first light from the tunable laser into an optical waveguide that is conducive to optical Brillouin scattering, the first light having a tunable optical frequency; launching second light from a reference laser into the optical waveguide for counter-propagating therein with the first light along a length of the optical waveguide; sweeping an optical frequency of the tunable laser about an optical frequency of the reference laser in a frequency range exceeding in width two Brillouin frequency shifts $v_B$ for the optical waveguide, so as to cause the lights from the tunable laser and the reference laser to experience stimulated Brillouin scattering (SBS) in the optical waveguide when the optical frequencies thereof differ by the Brillouin frequency shift $v_B$; recording, during the sweeping, a first value $F_1$ that is indicative of the optical frequency of the tunable laser at which the light thereof experiences an SBS induced gain in the optical waveguide, and a second value $F_2$ that is indicative of the optical frequency of the tunable laser at which the light thereof experiences an SBS induced loss in the optical waveguide; and, providing said first and second values of the optical frequency of the tunable laser for referencing changes in the optical frequency of the tunable laser to the SBS frequency shift $v_B$, or a multiple thereof.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Note that as used herein, the terms "first", "second" and so forth are not intended to imply sequential ordering, but rather are intended to distinguish one element from another unless explicitly stated. The terms 'negative peak' and 'positive peak' as used herein mean peaks that extend below and above, respectively, of a steady-state level, and do not necessarily mean to imply a certain polarity of a corresponding signal. The terms 'wavelength' and 'frequency' with reference to laser radiation are used herein interchangeably where it won't lead to a confusion, with the understanding that they are unambiguously related through a well-known inverse relationship and the speed of light.

Figure 1:
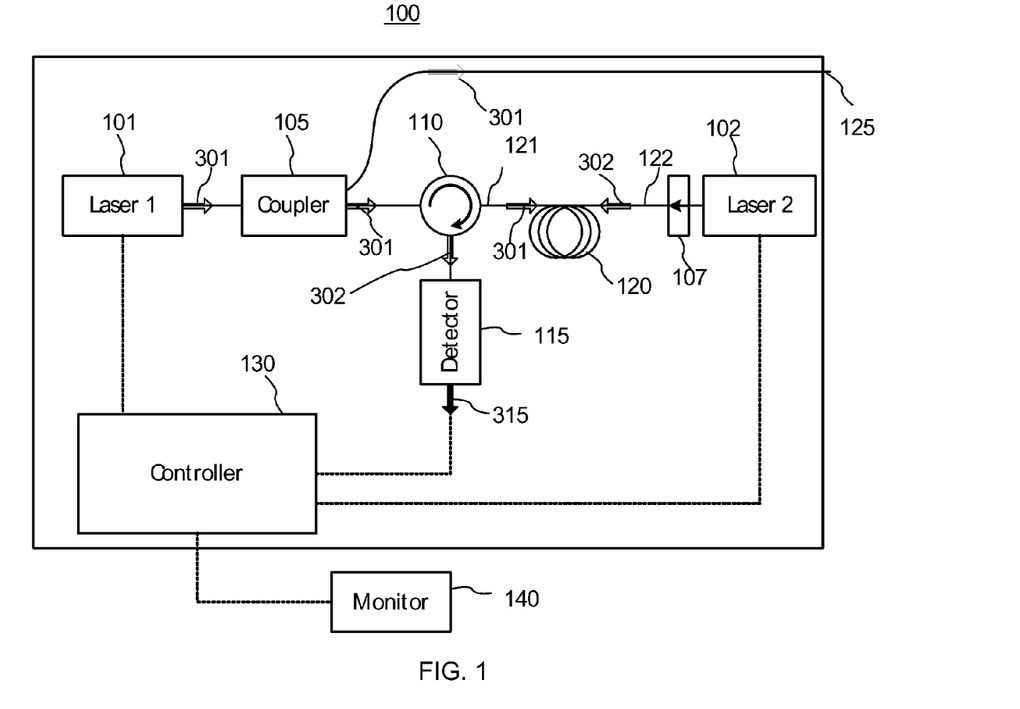
FIG. 1 is a schematic block diagram of an optical frequency referencing apparatus with SBS detection in back-propagating light according to an embodiment of the present invention.

With reference to FIG. 1, there is illustrated an optical frequency referencing apparatus (OFRA) 100 according to an embodiment of the present invention. In this and following figures representing block diagrams including two or more optical elements, optical connections between component devices are represented by solid lines, which in preferred embodiments signify connecting optical waveguides, such as optical fibers, but may also represent free-space optical coupling. Electrical connections are represented by dashed lines.

The OFRA 100 includes a tunable laser 101, a reference laser 102, an optical waveguide 120 that is conducive to the Brillouin scattering, a photodetector (PD) 115, a frequency referencing controller 130, and an output optical port 125. The tunable laser 101 and the reference laser 102 are also referred to herein as the first and second lasers, respectively. An optical divider 105 optically connects the tunable laser 101 to the output port 125, and to a first end 121 of the optical fiber 120. The reference laser 102 is optically coupled to the second end 122 of the optical waveguide 120. An optical tapping device 110 is further provided for tapping off a portion of light transmitted through the optical fiber 120, and for sending the tapped light onto the photodetector 115, which in turn electrically connects to the frequency referencing controller 130. The optical tapping device 110 is also referred to hereinbelow as the optical tap 110, and in the shown exemplary embodiment is in the form of an optical circulator.

Figure 2:
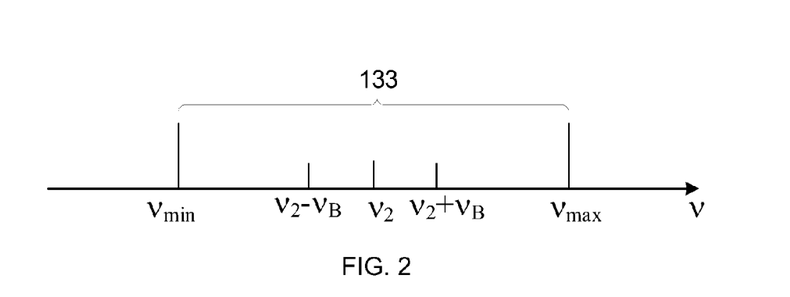
FIG. 2 is a schematic diagram illustrating a tuning range of the tunable laser in the apparatus of FIG. 1.

In operation, the tunable laser 101 generates light 301 having a tunable optical frequency $v_1$ that may be swept by the frequency referencing controller 130 in a frequency range 133 from a minimum optical frequency $v_{min}$ to a maximum optical frequency $v_{max}$, which is schematically illustrated in FIG. 2. At least a portion of the light 301 from the tunable laser 101 is launched through the optical divider 105 into the first end 121 of the reference fiber 120 for propagating therein in a direction towards the second end 122 of the fiber 120, which will be referred to herein as the first direction or the forward direction. The optical divider 105 also optionally sends at least a portion of the first light 301 into the output optical port 125 for providing to the user. In the following the light 301 from the tunable laser 101 that is launched into the fiber 120 may also be referred to as the first light, the tunable light, or the forward-propagating light. An optional optical isolator 107 may be used for preventing light 301 from the tunable laser 101 and back-reflected light of the reference laser 102 from entering an active region of the reference laser 102. In some embodiments, an optical isolator may also be provided at the output of the tunable laser 101 for preventing the second light and back-reflected first light from entering the tunable laser 101.

OFRA 100 may be used in laboratory and field instruments as a narrow-linewidth source of frequency-tunable light for fine spectral characterization of optical devices and optical systems, such as for example for characterizing optical communication systems. For example, OFRA 100 may be used in optical instruments for in-channel transmission characterization in DWDM networks, including for spectral measurements of the chromatic dispersion (CD), polarization mode dispersion (PMD), optical signal to noise ratio (OSNR), spectral profile of the optical attenuation, etc. For this purpose, OFRA 100 utilizes the light 301 of the tunable laser 101, which is provided to the user through the output optical port 125, and which optical frequency $v_1$, and thus the wavelength, may be tuned or swept by the frequency referencing controller 130.

In one embodiment, the tunable laser 101 is a CW laser source that is capable of a fast wide-range frequency tuning. By way of example, the tunable laser 101 emits in the 1550 nm wavelength range and is continually tunable across at least one of the C band, L band or S band of the ITU wavelength grid, such as for example a PHOENIX™ 1000 swept tunable laser from Luna Innovations Inc. Roanoke, Va., that is a MEMs-based external cavity laser capable of fast mode hop free tuning in the range of 1515 nm to 1565 nm with fiber output power of 10 mW. In other embodiments the tunable laser 101 may emit in a different wavelength range as suitable for a particular application, including but not limited to the 1.3 µm range.

One drawback of the tunable laser 101, when embodied using conventional widely tunable lasers such as those used for telecom applications, is that during frequency tuning their optical frequency $v_1$ is known with accuracy no better than about +\−500 MHz or even as low as +\−2.5 GHz, which is often insufficient for the purposes of wavelength-accurate optical channel characterization. The OFRA 100 addresses this deficiency of the tunable laser 101 by referencing its optical frequency using a high spectral selectivity of the SBS-induced optical energy transfer that occurs in the optical waveguide 120 between the light 301 of the tunable laser 101 and the light 302 of the reference laser 102.

In the shown embodiment the optical waveguide 120 is in the form of an optical fiber of a length that is suitable for detecting an SBS signal as described hereinbelow, and is referred to also as the reference fiber 120, or simply as the fiber 120. However the present invention also encompasses the use of other types of optical waveguides 120, with one non-exclusive example being an optical waveguide formed in a planar or otherwise shaped substrate, provided that the material and/or structure of the used optical waveguide is such that light of lasers 101 and/or 102 exhibit therein a level of stimulated Brillouin scattering that is detectable with the PD 115.

Advantageously, the spectral width $\Delta v_B$ of the SBS-induced gain or loss is suitably small to enable highly-selective wavelength and frequency referencing; by way of example, in the near-infrared zone of $\lambda \approx 1.5$ micrometers (µm), $\Delta v_B$ in silica-based fibers has an approximate width of 0.05 picometers (pm) in the wavelength domain, or about 30 MHz in the frequency domain.

In one preferred embodiment, the optical waveguide 120 is a single-mode polarization-maintaining fiber having a length L in the range of about 1 m to about 1000 m or longer. In some embodiments, material and waveguiding structure of the reference fiber 120 may be selected for providing a desired value of the SBS frequency shift, and for increasing the SBS strength therein. The length of the reference fiber 120 may be selected in dependence upon in-fiber optical power $P_1$ and $P_2$ that is available from the lasers 101 and 102, respectively. By way of example, both $P_1$ and $P_2$ may be in the range of 1-10 mW, and the length L of the reference fiber 120 may be in the range 5-50 meters, and preferably in the range of 10 to 30 m to provide good performance at relatively low cost and size.

The reference laser 102 generates light 302 at a reference optical frequency $v_2$, which is also referred to herein as the second optical frequency. This light 302, which is also referred to herein as the second light or reference light, is launched into the fiber 120 for counter-propagating therein with the first light 301 for interacting with the first light 301 along a length of the optical fiber 120 by means of the stimulated Brillouin scattering (SBS). The direction of propagation of the second light 302 in the optical fiber 120, i.e. the direction from the second end 122 of the optical fiber towards the first end 121 thereof, will be referred to herein as the second direction or the return direction. The reference laser 102 may be a CW laser that operates at a stationary optical frequency $v_2$ and may be wavelength-stabilized. In one embodiment, the reference laser 102 may be wavelength-locked, for example using an internal or external Fabry-Perot (FP) etalon (not shown) as known in the art, to either a single reference wavelength, or one of a series of wavelengths corresponding to different spectral features of the FP etalon. For example, the reference laser 102 may be embodied using an integrable tunable laser assembly (ITLA) 5205-T/5206-T, which is commercially available from JDSU and includes a sampled grating distributed Bragg reflector (SG-DBR) laser, monolithically integrated with a semiconductor optical amplifier (SOA) and an integral wavelength locker, all enclosed in a high-reliability, hermetically-sealed TOSA package.

In the embodiment of FIG. 1, the optical tap 110 is in the form of an optical circulator that couples light 301 from the tunable laser 101 into the optical fiber 120, and sends counter-propagating light 302 of the reference laser onto the PD 115 after it exists the optical waveguide 120. One advantage of using an optical circulator as the optical tap 110 is that it serves simultaneously as an optical isolator, preventing back-propagating light from entering the tunable laser 101. The optical tap 110 may also be in the form of a directional coupler, in which case a second optical isolator may be used to optically isolate the tunable laser 101 from back-reflections and the light 302 from the reference laser 102. Optionally, one or more polarization controllers (not shown) may be used in the optical paths between the tunable laser 101 and the first fiber end 121, and the reference laser 102 and the second fiber end 122, in order to ensure that the light 301 of the tunable laser 101 and the light 302 of the reference laser 102 are polarized in a same plane for more efficient SBS interaction therebetween.

The optical divider 105 may be embodied, for example, using an optical coupler, such as a directional fiber-optic coupler that is available commercially from JDSU in various coupling ratios, and will be referred to hereinafter also as the first coupler 105. However according to the invention the optical divider 105 may also be embodied using other suitable optical components, such as, for example, an optical switch, so that the first light 301 generated by the tunable laser 101 could be switched between the output port 125 for providing the first light to a user, and the optical waveguide 120 for frequency referencing as described hereinbelow. By way of example, the first coupler 105 has a 50/50 splitting ratio, sending to the optical port 125 and the optical fiber 120 each about 50% of the light of the tunable laser 101, although couplers with differing splitting ratios could also be used.

In the shown embodiment, the optical tap 110 is coupled at the first end 121 of the fiber 120 for tapping of a portion of light that is transmitted through the fiber 120 in the return direction towards the first end 121. This light is referred to hereinafter also as the back-propagating light, while light that propagates in the fiber 102 in the forward direction towards the second end thereof 122 and the reference laser 102, is also referred to as the forward-propagating light. The back-propagating light is composed of the reference laser light 302 that gets transmitted through the fiber 120, plus possibly back-scattered first light 301 of the tunable laser 101.

Figure 3:
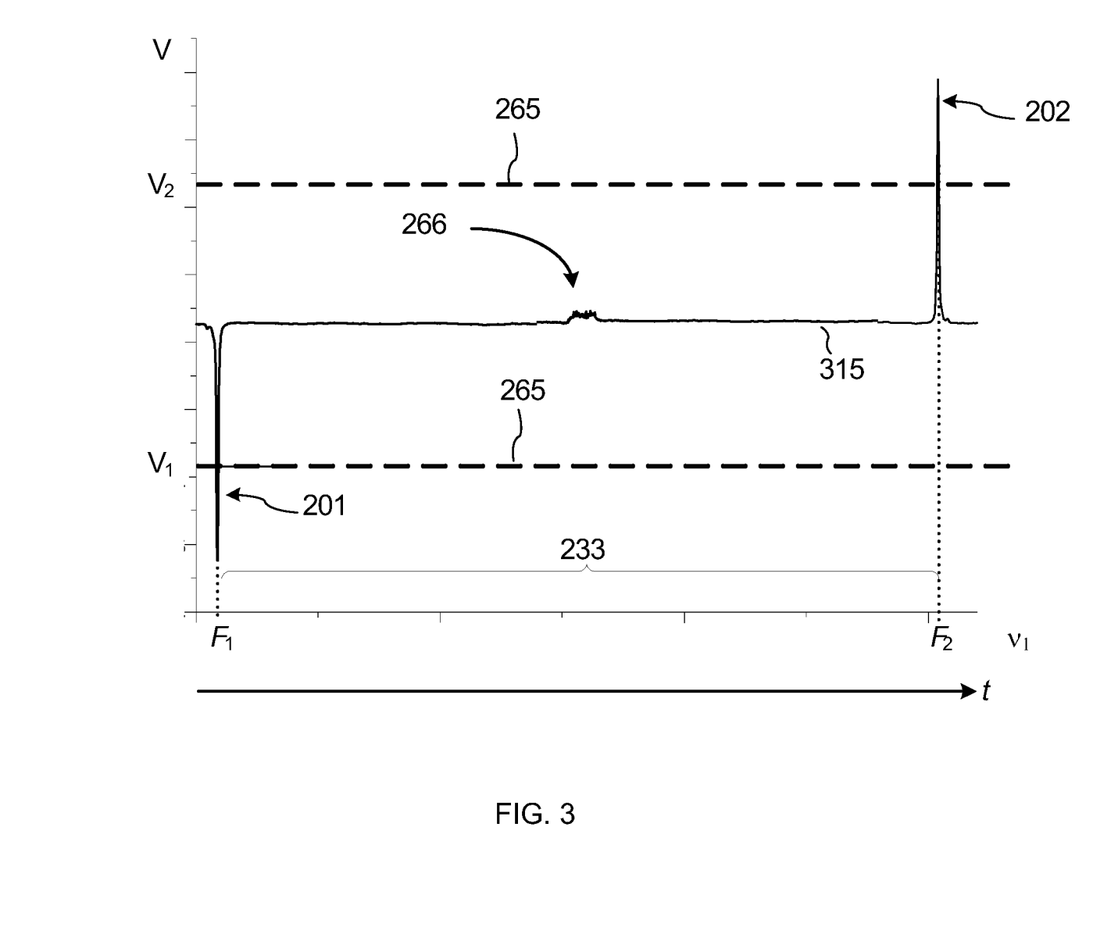
FIG. 3 is a graph illustrating SBS-induced gain and loss peaks in the detected optical signal.

Referring to FIG. 3, there is illustrated an experimentally measured dependence of the PD signal 315 on the nominal tunable frequency $v_1$ during a frequency sweep, with the vertical axis representing the PD signal strength in arbitrary units, and the horizontal axis representing the nominal tunable frequency $v_1$ during the sweep. Since the PD signal 315 is generally proportional to the optical power at the PD 115, the vertical axis simultaneously represents changes in the optical power of the detected light. The measurements were performed using 20 m of SMF28e fiber from Corning Inc., with each of the lasers 101, 102 generating about 7 mW of in-fiber optical power. In this case of the fiber 210 not maintaining the polarization, a polarization controller at the second fiber end 122 was used to adjust the polarization state of light 302 of the reference laser 102 for a maximal interaction with light 301 in the fiber 120.

When the tunable frequency $v_1$ of the first laser 101 is less than the reference frequency $v_2$ by the SBS frequency shift $v_B$ in the optical fiber 120, i.e. when the following condition is satisfied at least with the accuracy on the order or better than $+\backslash-\Delta v_B$:

$$v_1 = v_2 - v_B, \quad (1)$$

a fraction of the optical power of the back-propagating second light from the reference laser 102 is transferred into the forward propagating light, so that the back-propagating reference light that reaches the optical tap 110 experiences the SBS-induced loss. The depletion of the back-propagating light 302 due to this additional SBS-induced loss reduces the optical power received by the photodetector 115 by $\Delta P_1$, generally resulting in a negative change in the PD output electrical signal 315. When the nominal frequency of the tunable laser 101 is quickly swept across the frequency range 133, the SBS-induced loss results in a negative peak in the optical power that is detected using the PD 115, as illustrated in FIG. 3 at 201.

Similarly, when the tunable frequency $v_1$ of the first laser 101 is greater than the reference frequency $v_2$ by the SBS frequency shift $v_B$ in the optical fiber 120, i.e.

$$v_1 = v_2 + v_B, \quad (2)$$

a fraction of the optical power of the forward-propagating first light 301 from the tunable laser 101 is transferred into the back-propagating reference light 302, effectively amplifying said light. Accordingly, the back-propagating second light 302 that impinges upon the optical tap 110 experiences the SBS-induced gain, effectively increasing the optical power received by the photodetector 115 by $\Delta P_2$. When the nominal frequency of the tunable laser 101 is swept across the frequency range 133, this SBS-induced gain results in a positive peak in the optical power detected by the PD 115, as illustrated in FIG. 3 at 202.

The magnitude of these SBS peaks, i.e. the amount of the SBS-induced gain and loss that is seen by the reference light 302, depends on the properties of the optical fiber 120, an effective interaction length $L_{eff}$ in the fiber for the first and second light, which is substantially the length L of the optical fiber 120 between the optical tap 110 and the isolator 107 where the tunable light 301 and the reference light 302 counter-propagate if the non-SBS optical loss in the fiber is relatively small, and the optical power of the first light and second light $P_1$, $P_2$ within the fiber.

By way of example, under a simplifying assumption that the powers of the two lasers are equal, which is however not required in the present invention, the power lost by the first light 301 at 201 is equal to the power gained by the first light 301 at 202, i.e. $\Delta P_1 = \Delta P_2$. Assuming for clarity that fiber loss is negligible and that the linewidth of each of the lasers 101 and 102 is narrower than the Brillouin gain width, the absolute value of the Brillouin gain G at the resonances defined by equations (1), (2) may be approximated using the following equation (3):

$$G \approx \exp\left(\frac{g_B P L}{A_{eff}}\right), \quad (3)$$

where $A_{eff}$ is the effective area of the fiber 120, L is the fiber length, $g_B$ is the Brillouin gain coefficient, and P the in-fiber power of each of the lasers 101, 102. By way of example, for a polarization maintaining fiber of length L=20 m, with $A_{eff}$=86 μm$^2$, $g_B$=5.10$^{-11}$ m/W, and P=10 mW, the maximum power change at the positive and negative SBS peaks 201, 202 will represent about 12% of the transmitted optical power. The apparatus 100 of the present invention can incorporate bigger or smaller lengths of the optical fiber 120, and/or larger or smaller in-fiber optical powers of the first and second light 301, 302, resulting in smaller amounts of the SBS gain and loss; the only requirement is that it they are sufficiently large for the changes in the optical power at the photodetector 115 are detectable by the frequency referencing controller 130.

If the reference frequency $v_2$ is known with a better accuracy than the frequency $v_1$ of the tunable laser 101 during a frequency scan, these SBS induced dip 201 and peak 202 in the optical power at the photodetector 115 may provide reference points and/or a scale for determining the tunable frequency $v_1$ during a frequency scan. If the reference frequency $v_2$ is not known with a suitably high accuracy, these SBS induced dip and peak in the optical power at the photodetector 115 may provide at least a scale for referencing changes in the tunable frequency $v_1$ during a frequency scan.

Figure 4:
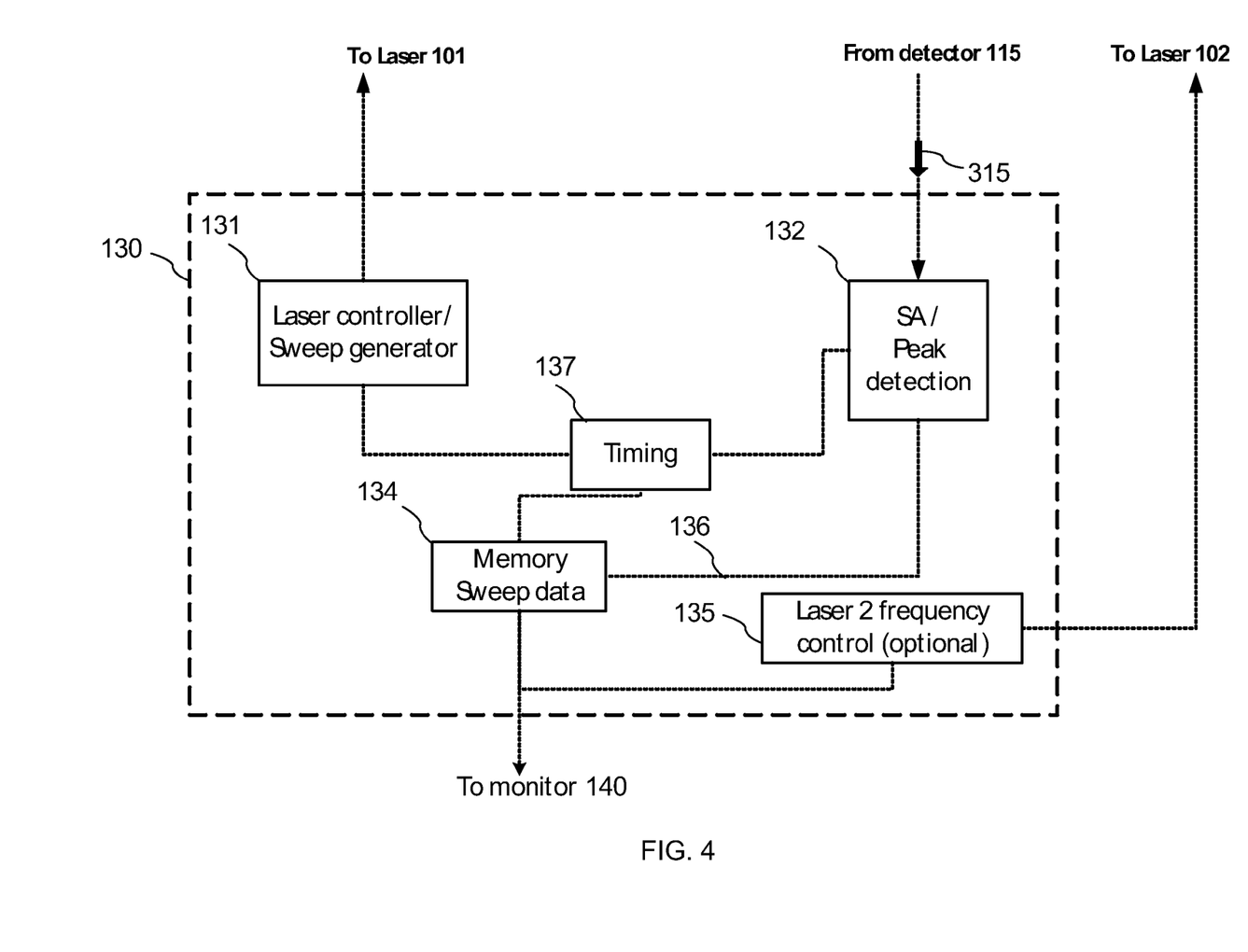
FIG. 4 is a schematic block diagram of one embodiment of a frequency referencing controller in the apparatus of FIG. 1.

Referring now to FIG. 4, there is illustrated a schematic block diagram of the frequency referencing controller (FRC) 130 according to one exemplary embodiment of the invention. It includes a tunable laser controller or driver (TLC) 131 that is electrically connected to the tunable laser 101 for controlling the tunable optical frequency $v_1$ of the first light 301. In one embodiment the TLC 131 is capable of generating an electrical drive signal $J_1(t)$ for controlling the tunable laser 101, and in particular for setting the optical frequency $v_1$ thereof. In one embodiment, the signal generator 131 is a sweeping signal generator that is operable to sweep the tunable frequency $v_1$ over the frequency range 133 in dependence upon a timing signal that is provided by a timing circuit or source 137, which may be embodied as known in the art. The frequency referencing controller 130 further includes a signal analyzer (SA) 132 that is electrically coupled to the photodetector 115 for analyzing the electrical signal 315 at the output thereof, and for detecting changes in the detected optical power such as the positive and negative peaks 202, 201. A recording component 134 such as a memory device for storing frequency sweep data, including reference frequency values obtained during the sweep as described hereinbelow, and a reference laser controller (RLC) 135 may further be provided in at least some embodiments of the controller 130. In some embodiments, the recording component 134 may be in the form, or incorporate, a display 140 for displaying the frequency sweep data. In other embodiments, the display 140 may be an external device as illustrated in FIG. 1.

Typically, a particular value of the control signal $J_1(t)$ is associated with a certain nominal value of the tunable frequency $v_1$, i.e. $v_1 = v_1(J_1)$, for example as obtained via a calibration procedure. However, the actual optical frequency of the light 301 generated by the tunable laser 101 may deviate from its nominal value, for example due to laser and/or controller aging, inaccuracies in the calibration procedure, environmental variations etc. Advantageously, the present invention enables improving at least a relative accuracy of the tunable frequency $v_1$ by referencing it to the optical frequency $v_2$ of the reference laser radiation 302 and/or the Brillouin frequency shift $v_B$ in the optical waveguide 120.

Accordingly, in one aspect of the present invention the OFRA 100 implements a method for referencing the frequency $v_1$ of the tunable laser 101, or changes thereof. Exemplary embodiments of this method, along with the operation of the controller 103, will now be described with reference to a flowchart of FIG. 5, and also with reference to FIGS. 1-4, 6-8.

Figure 5:
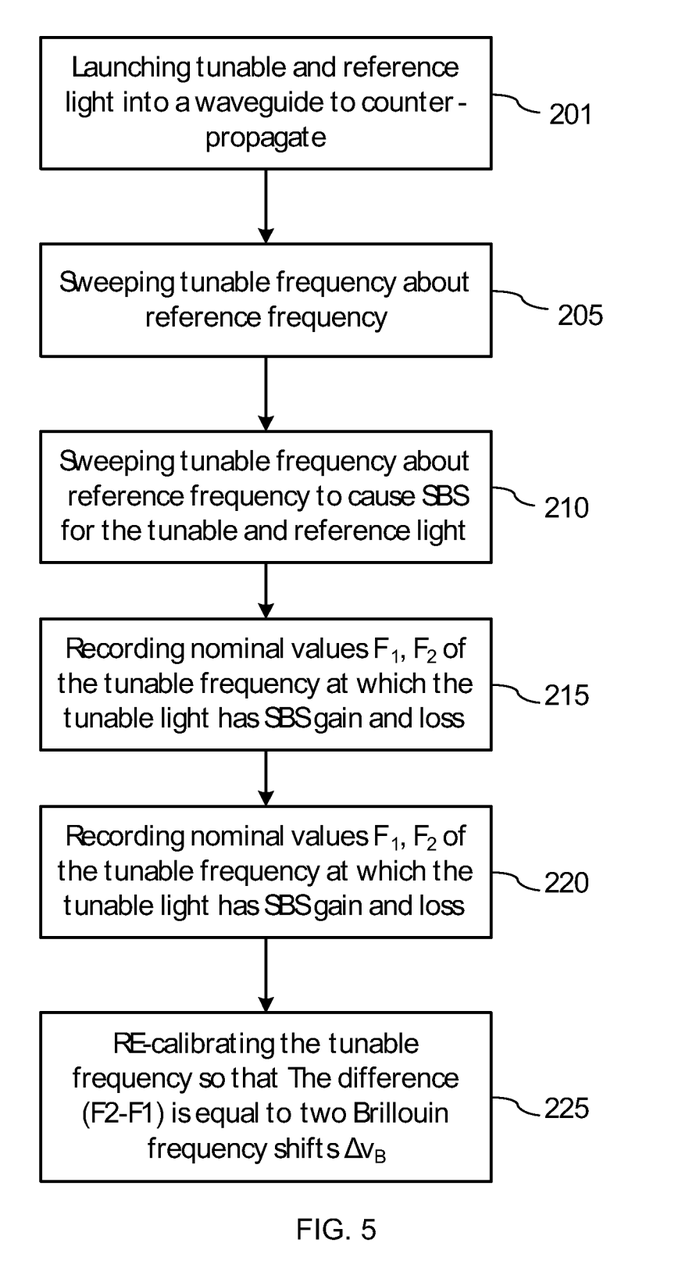
FIG. 5 is a flowchart of a process of optical frequency referencing in accordance with an embodiment of the present invention.

Turning now to FIG. 5, an exemplary method 200 of frequency referencing for a tunable laser, such as the tunable laser 101, includes the following steps or processes. At step 203, launching first light 301 from the tunable laser 101 into the optical waveguide 120 that is conducive to optical Brillouin scattering, the first light 301 having a tunable optical frequency $v_1$, and launching the second light 302 from the reference laser 102 into the optical waveguide 120 for counter-propagating therein with the first light 301 along a length of the optical waveguide 102.

At step 205, sweeping the optical frequency $v_1$ of the tunable laser 101 about the optical frequency $v_2$ of the reference laser 102 in a frequency range 133 exceeding in width two Brillouin frequency shifts $v_B$ for the optical waveguide 120, so as to cause the lights 301, 302 from the tunable laser 101 and the reference laser 102 to experience stimulated Brillouin scattering (SBS) in the optical waveguide 120 when the optical frequencies thereof differ by the Brillouin frequency shift $v_B$, that is satisfy equations (1) and (2) with accuracy about or better than the Brillouin gain width $\Delta v_B$.

At step 210, recording, during the frequency sweep, a first nominal value $F_1$ of the optical frequency $v_1$ of the tunable laser 101 at which the first light 301 experiences an SBS induced gain in the optical waveguide 120, or a value indicative thereof. We note that the same SBS process that results in the SBS gain for the forward-propagating light 301 of the tunable laser simultaneously leads to an SBS loss for the back-propagating reference light 302 of the reference laser 102. Turning back to FIG. 1, in the shown embodiment this step may include detecting, with the PD 115 and the SA 132, a temporary reduction in the optical power of the back-propagating reference light 302 at the first fiber end 121.

Figure 6:
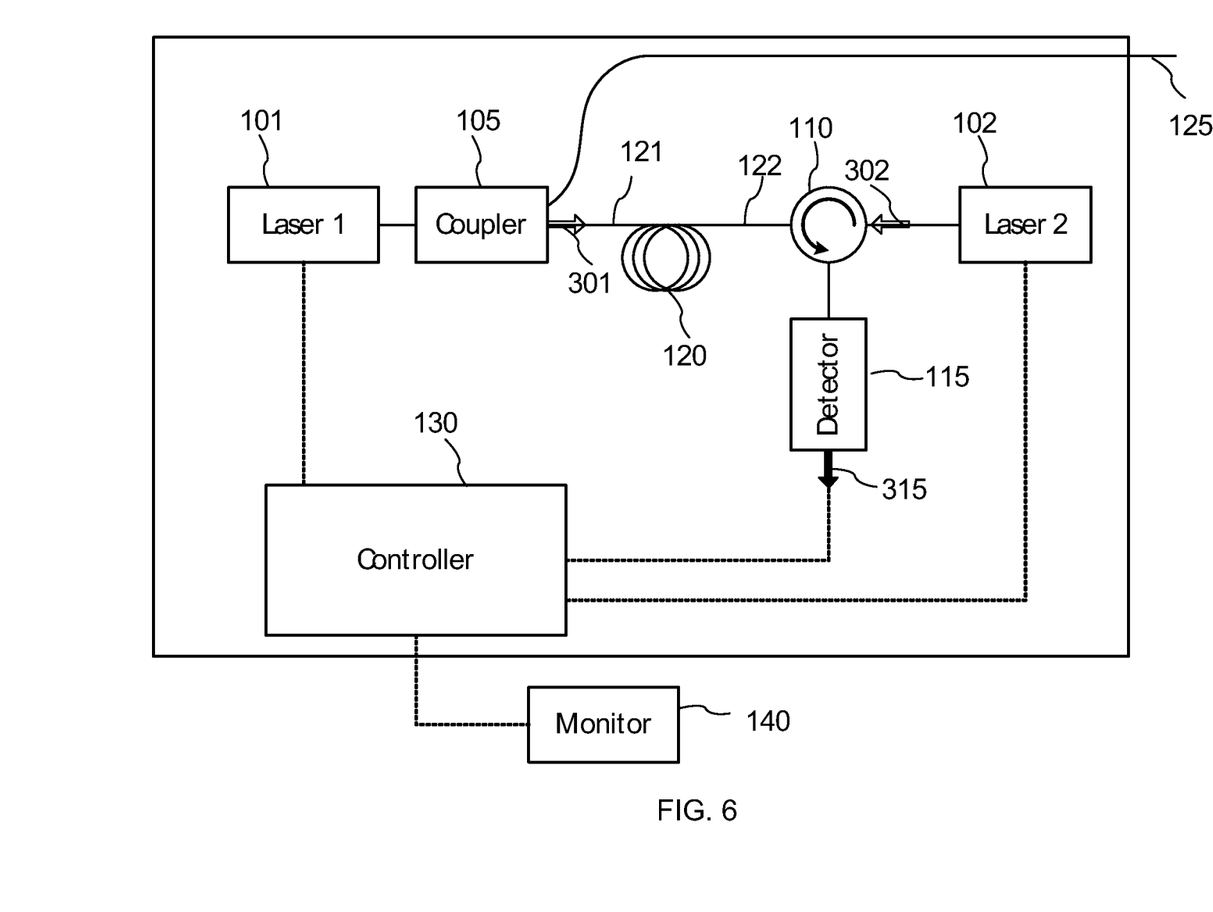
FIG. 6 is a schematic block diagram of an optical frequency referencing apparatus with SBS detection in forward-propagating light according to an embodiment of the present invention.

Referring to FIG. 6, there is shown a variation of the OFRA 100 wherein the optical tap 110 is located at the second fiber end 122 of the reference fiber 120 for tapping off a fraction of the tunable light 301 after transmitting through the fiber 120. In this embodiment, step 210 is in the form of detecting an increase in the optical power of the forward-propagating tunable light 301 at or near the second fiber end 122.

Referring back to FIG. 5, the frequency referencing process 200 further includes step 215 of recording, during the frequency sweep 205, a second nominal value $F_2$ of the tunable optical frequency $v_1$ at which the first light 301 experiences an SBS induced loss in the optical waveguide 120, or a value indicative thereof. Similarly to step 210, this step may include detecting a temporary increase in the optical power of the back-propagating reference light 302 at the first fiber end 121 for the OFRA of FIG. 1, and/or detecting a temporary drop in the optical power of the forward-propagated tunable light 301 at the second fiber end 122 as in the OFRA of FIG. 6.

In step 220, the first and second nominal values $F_{1,2}$ of the optical frequency $v_1$ of the tunable laser 101 are provided for referencing changes in the optical frequency of the tunable laser 101 with respect to the SBS frequency shift $\Delta v_B$, or more particularly to twice the SBS frequency shift $2\Delta v_B$. In one embodiment, this step includes saving these values in the frequency sweep memory 134. In one embodiment, these values are further provided to an external monitor or display 140 for visualization, for example along with a visualization of the frequency sweep data. In one embodiment, the SA 132 may save in memory 134 data related or reproducing the time-sampled electrical signal 315 during the sweep 205, for visualizing on the monitor 140 and/or further analysis.

In one embodiment, the method further includes step 225 wherein the nominal frequency $v_1(J)$ of the tunable laser 101, as defined for example by the tunable laser control signal $J_1(t)$, is re-calibrated, e.g. scaled, so that a difference $\Delta F=(F_2-F_1)$ between the first and second nominal values of the optical frequency $v_1$ of the tunable laser 101 is equal to $2v_B$.

In one embodiment, the optical frequency $v_2$ of the reference laser 102 can be selectively set to one of a plurality of possible operating frequencies using a control signal from the RLC 135. For example, the reference laser 102 may be a semiconductor laser based device that utilizes an FP etalon for frequency locking or stabilization, and which operating frequency may be stepped over a relatively wide wavelength range with a frequency step defined by the FSR of the FP etalon. In such embodiments, step 205 of the frequency referencing method of the present invention may be preceded by the steps of i) selecting the desired frequency tuning range 133, and ii) adjusting the reference frequency $v_2$ of the reference laser 102 so as to set it at one of the plurality of possible operating frequencies defined therefor that lies within the desired tuning range 133 at a distance of at least $v_B$ from each of the lower and upper boundaries of the selected tuning range.

Referring back to FIG. 4, in the shown embodiment steps 215 and 220 of the method 200 are carried out with the SA 132, which is operative to analyze the electrical signal 315 that is produced during the sweeping 205 of the tunable frequency $v_1$ across the frequency range 133, and to determine the first and second nominal values $F_{1,2}$ of the tunable frequency at which the first light 301 experiences an SBS induced gain or loss, respectively, in the optical waveguide 120. In order to accomplish that, the SA 115 may detect positive and negative changes in the PD electrical signal 315, or positive or negative peaks therein that may be attributed to the SBS interaction of the first and second lights in the optical waveguide 120.

Figure 8:
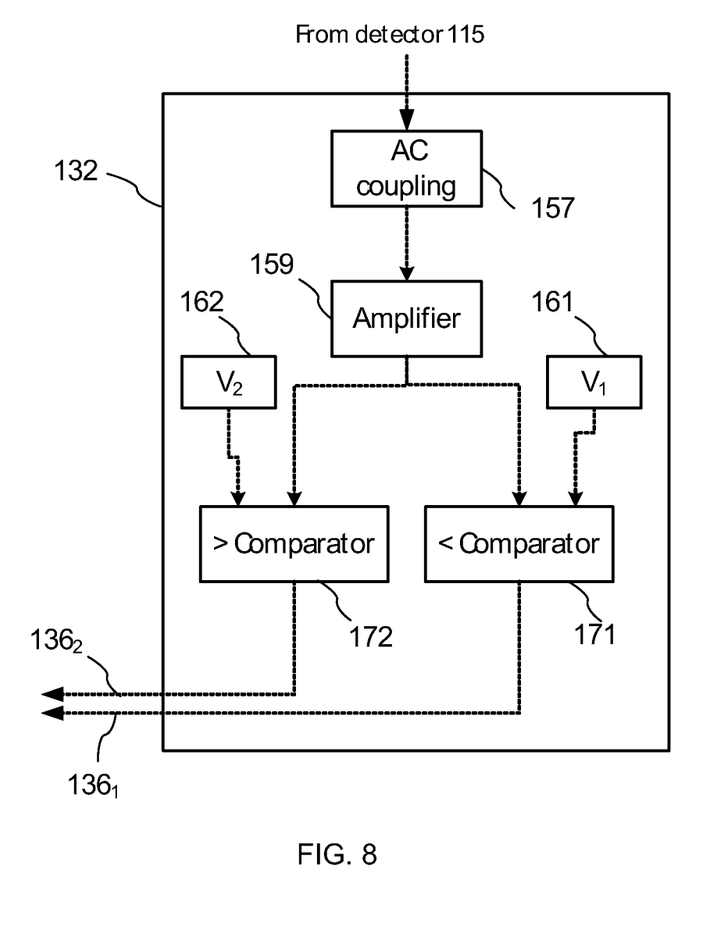
FIG. 8 is a schematic block diagram of a PD signal analyzer in one embodiment of the frequency referencing controller of FIG. 1.

With reference to FIG. 8, in one embodiment the SA 132 is an analog electrical circuit that may be AC-coupled or DC-coupled at the output of the PD 115 for receiving and analyzing the PD signal 315 while the first frequency $v_1$ is being swept. In the shown embodiment the SA 132 is AC-coupled and includes an AC-coupling sub-circuit 157 that is followed by an optional amplifier 158 that is operationally followed by first and second comparators 171, 172 connected in parallel. The operation of this circuit may be understood by referring to FIG. 3 that shows the amplified PD signal 315 in dependence on the nominal tunable frequency during the frequency sweep, when $v_1$ is continuously or quasi-continuously increased or decreased with time from less than $(v_2-v_B)$ to above $(v_2+v_B)$. Referring to both FIG. 8 and FIG. 3, the first comparator 171 generates a first trigger signal 136₁ when the amplified PD signal 315 falls during the sweep below a first threshold level $V_1$, which may be provided to the comparator 171 from a first threshold level source 161. The second comparator 172 generates a second trigger signal 136₂ when the amplified PD signal 315 exceeds a second threshold level $V_2$, which may be provided to the comparator 172 from a second threshold level source 162. In FIG. 3 the threshold levels $V_{1,2}$ are illustrated with horizontal dashed lines 265. The timings of these trigger signals determine the first and second nominal values $F_{1,2}$ of the tunable frequency $v_1$ corresponding to $(v_2-v_B)$ and $(v_2+v_B)$, respectively. In the exemplary embodiment shown in FIG. 3, the distance $(F_2-F_1)=2v_B$ between the peaks 201, 202 is known to be about 147.6 vm in wavelength units, corresponding to the SBS shift $v_B$ equal to 12.817 GHz, with the accuracy defined by the SBS gain $\Delta v_B$.

Advantageously, the width of the SBS-induced positive and negative peaks 201, 202 in the PD signal 315, which are defined by the Brillouin gain width $\Delta v_B$, may be quite narrow, for example about 30-50 MHz in silica-based fibers, thereby enabling the determination of the frequency difference $(F_2-F_1)$ therebetween for the tunable laser 101 with the accuracy on the order of a few tens of MHz or better. This accuracy may be further improved by utilizing peak fitting algorithms instead of, or in addition to, the thresholding provided by the comparators 171 and 172, for example by saving the time-dependent PD signal 315 in memory.

Other embodiments of the SA 132 are of course possible and will be apparent to those skilled in the art. In one embodiment, each of the comparators 171 and 172 generate a trigger signal at crossing the respective threshold level 265 at each side of the respective peak 201 or 202, i.e. at each positive and negative slope of the respective peaks in the PD signal 315, thereby enabling to better locate extreme points of the peaks 201, 202. In one embodiment, SA 132 may include a digital to analog converter (DAC) followed by a digital processor coupled to a memory and configured to perform peak detection in a sampled PD signal 315 for detecting the SBS peaks 201, 202.

In one embodiment, the SA 132 may detect and utilize low-frequency beats that appear in the PD signal 315 when the tunable frequency $v_1$ is about equal to the reference frequency $v_2$, as indicated by a noisy peak 266 in FIG. 3. A central point of these noisy peak may be utilized as another frequency reference point for the tunable laser 101.

Accordingly, the OFRA 100 enables to reference changes in the frequency of the tunable laser 101 with accuracy on the order or better than about 30 MHz, which is significantly better than the frequency or wavelength setting accuracy of most if not all commercial lasers that are capable of wide-range frequency tuning and can be used in portable devices in the field.

FIGS. 1 and 6 illustrate embodiments of OFRA 100 that include a single PD 115 that is coupled at either end of the reference fiber 120 for detecting the SBS-induced variations in the optical power of either the reference light 302 transmitted through the fiber 120, or the tunable light 302 transmitted through the fiber 120.

Figure 7:
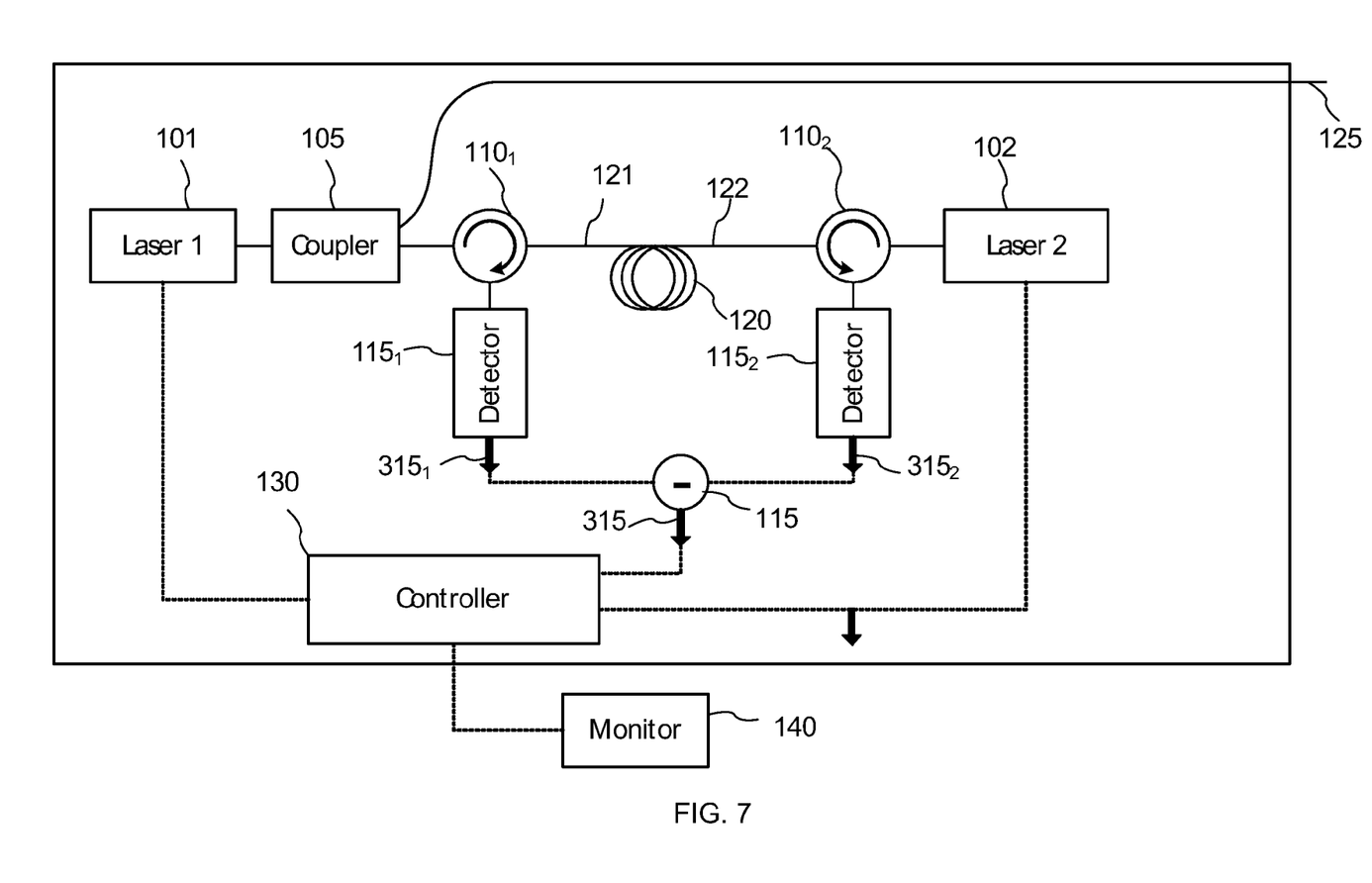
FIG. 7 is a schematic block diagram of an optical frequency referencing apparatus with differential SBS detection according to an embodiment of the present invention.

With reference to FIG. 7, the SBS detection sensitivity of the device can be somewhat increased by using two optical taps 110₁, 110₂ that are located at both ends of the optical fiber 120 and are individually coupled to two PDs 115₁, 115₂ for simultaneously detecting fractions of the tunable light 301 and the back-propagated reference light 302 after transmitting of these lights through the fiber 120. Electrical output signals of the PDs 115₁, 115₂ are provided to a subtracting element 115, such as for example a differential amplifier or other suitable subtracting element or circuit, which generates an electrical signal that is proportional to a difference between the electrical signals 315₁, 315₂ from the PDs 115₁ and PD 115₂, thereby reducing or eliminating a CW component of the electrical signal and enhancing the SBS-induced peaks therein. Although FIG. 7 shows the subtractor 115 outside of the controller 130, the controller 130 may also be viewed as incorporating the subtractor 115, and receiving the two PD signals 315₁,₂ as inputs. In this embodiment of OFRA 100, step 210 of the method of FIG. 5 includes detecting a simultaneous increase in the optical power of the forward-propagating tunable light 301 at or near the second fiber end 122, and a reduction in the optical power of the back-propagating reference light 302 at or near the first fiber end 121. Similarly, in this embodiment of OFRA 100, step 215 of the method of FIG. 5 includes detecting a simultaneous reduction in the optical power of the forward-propagating tunable light 301 at or near the second fiber end 122, and a rise in the optical power of the back-propagating reference light 302 at or near the first fiber end 121. By subtracting one of the electrical outputs of the PDs 115 from the other with the subtractor 115, an electrical signal is obtained that is more sensitive to the SBS effect in the fiber 120.

In one embodiment, the controller 130 of the OFRA 100 may also be adopted to set the frequency $v_1$ of the tunable laser 101 to any particular value within the calibrated tuning range 133. This may be accomplished, for example, by first scanning the tunable frequency $v_1$ by varying the drive current J, calibrating the wavelength scan $v_1(J)$ with regard to the peaks 201 and 202, and setting the drive current J that corresponds to the desired frequency. This technique would rely on the frequency stability of the laser 101 over the time required to perform a measurement using the light of the tunable laser. This wavelength referencing and wavelength setting process may be repeated at pre-determined intervals or prior to each measurement or other desired use of the light of the tunable lase 101 requiring the particular value of the frequency $v_1$.

In one embodiment, the controller 130 of the OFRA 100 may also be adopted to lock the frequency $v_1$ of the tunable laser 101 to any one of the SBS peaks 201, 202 in the PD signal 315. This may be accomplished, for example, by first scanning the tunable frequency $v_1$ by varying the drive current J, identifying the value $J_1$ of the drive current J that corresponds to a center or a desired slope of the selected peak 201 or 202, and setting the drive current J to the identified value. Furthermore, the timing circuit 137 in the controller 130 may be adopted to provide feedback to the TLC 131 for maintaining the tunable frequency $v_1$ at a desired operating point within the selected peak 201, 202 using known is the art techniques.

The invention has been described hereinabove with reference to the exemplary embodiments such as those shown in FIGS. 1, 4-8, but is not limited thereto, and other embodiments and modifications to the described embodiments will be apparent to those skilled in the art having the benefit of the present description.

I claim:

1. An optical frequency referencing device, comprising:
   an optical waveguide having material properties conducive for Brillouin scattering;
   a tunable laser for launching first light of a tunable frequency into the optical waveguide for propagating therein in a first direction;
   a reference laser for launching second light of a reference frequency into the optical waveguide in a second direction for counter-propagating therein with the first light and for interacting with the first light by means of stimulated Brillouin scattering (SBS);
   one or more detectors coupled to the optical waveguide at at least one end thereof for detecting at least one of the first and second light after propagation thereof through the waveguide and for producing at least one electrical signal responsive to changes in optical power thereof; and,
   a frequency referencing controller (FRC) coupled to the first laser and the one or more detectors and comprising:
   a tunable laser controller operable to sweep the tunable frequency about the reference frequency in a frequency range exceeding two Brillouin frequency shifts $\Delta v_B$ in the optical waveguide; and,
   a signal analyzer configured for analyzing the one or more electrical signals produced during said sweeping and for determining a first value of the tunable frequency at which the first light experiences an SBS induced gain in the optical waveguide, and a second value of the tunable frequency at which the first light experiences an SBS induced loss in the optical waveguide, the first and second values providing a relative frequency reference for the tunable laser.

2. The device of claim 1 wherein the frequency reference controller comprises a recording component for recording said first and second nominal values of the tunable frequency for providing the relative frequency reference for the tunable laser.

3. The device of claim 2, wherein the recording component comprises a memory device.

4. The device of claim 1, wherein the tunable laser is coupled to the optical waveguide at a first end thereof, the reference laser is coupled to the optical waveguide at a second end thereof, and wherein the one or more detectors comprise a first photodetector coupled at the first end of the optical waveguide for detecting the second light transmitted through the optical waveguide, and for producing the at least one electrical signal that is proportional to an optical power of the second light.

5. The device of claim 1, wherein the tunable laser is coupled to the optical waveguide at a first end thereof, the reference laser is coupled to the optical waveguide at a second end thereof, and wherein the one or more detectors comprise a first photodetector coupled at the second end of the optical waveguide for detecting the first light that is transmitted through the optical waveguide, and for producing the at least one electrical signal that is proportional to an optical power of the first light.

6. The device of claim 1, wherein the one or more detectors comprise first and second photodetectors individually coupled to the optical waveguide at opposite ends thereof for separately detecting light transmitted therethrough in the first and second directions.

7. The device of claim 6, further comprising two optical tapping devices coupled to the optical waveguide at opposite ends thereof for coupling at least portions of light transmitted through the optical fiber in the first and second directions into the first and second photodetectors, respectively.

8. The device of claim 1, wherein the optical waveguide comprises a single-mode optical fiber.

9. The device of claim 8, wherein the single-mode optical fiber is a polarization-maintaining optical fiber.

10. The device of claim 1, further comprising an optical tapping device coupled to the optical waveguide at an end thereof for tapping off at least a portion of light transmitted through the optical waveguide in the first or second directions and for directing tapped off light into the one or more detectors.

11. The device of claim 10, wherein the optical tapping device comprises a directional optical coupler or an optical circulator.

12. The device of claim 1, wherein the reference laser is for emitting the second light having a spectral linewidth that is smaller than a spectral width of the SBS induced gain.

13. The device of claim 1, wherein the reference laser comprises a wavelength locker for wavelength stabilization of the second light at one of a plurality of operating frequencies.

14. The device of claim 1, wherein the FRC includes a reference laser controller for selectively stepping the reference frequency between one of a plurality of possible operating frequencies of the reference laser.

15. An optical frequency referencing device, comprising:
   an optical waveguide having material properties conducive for Brillouin scattering;
   a tunable laser for launching first light of a tunable frequency into the optical waveguide for propagating therein in a first direction;

a reference laser for launching second light of a reference frequency into the optical waveguide in a second direction for counter-propagating therein with the first light and for interacting with the first light by means of stimulated Brillouin scattering (SBS);

one or more detectors coupled to the optical waveguide at at least one end thereof for detecting at least one of the first and second light after propagation thereof through the waveguide and for producing at least one electrical signal responsive to changes in optical power thereof; and, a frequency referencing controller (FRC) coupled to the first laser and the one or more detectors and comprising:
a tunable laser controller operable to sweep the tunable frequency about the reference frequency in a frequency range exceeding two Brillouin frequency shifts $\Delta v_B$ in the optical waveguide; and,
a signal analyzer for analyzing the one or more electrical signals produced during said sweeping and for determining a first value of the tunable frequency at which the first light experiences an SBS induced gain in the optical waveguide, and a second value of the tunable frequency at which the first light experiences an SBS induced loss in the optical waveguide, the first and second values providing a relative frequency reference for the tunable laser, wherein the one or more detectors comprise first and second photodetectors individually coupled to the optical waveguide at opposite ends thereof for separately detecting light transmitted therethrough in the first and second directions, and wherein the first and second photodetectors are electrically coupled in a differential arrangement for detecting a difference between optical powers of the first and second light after propagating thereof through the optical waveguide.

16. A method of frequency referencing for a tunable laser, comprising:
launching first light from the tunable laser into an optical waveguide that is conducive to optical Brillouin scattering, the first light having a tunable optical frequency;
launching second light from a reference laser into the optical waveguide for counter-propagating therein with the first light along a length of the optical waveguide;
sweeping an optical frequency of the tunable laser about an optical frequency of the reference laser in a frequency range exceeding in width two Brillouin frequency shifts $v_B$ for the optical waveguide, so as to cause the lights from the tunable laser and the reference laser to experience stimulated Brillouin scattering (SBS) in the optical waveguide when the optical frequencies thereof differ by the Brillouin frequency shift $v_B$;
recording, during the sweeping, a first value $F_1$ that is indicative of the optical frequency of the tunable laser at which the light thereof experiences an SBS induced gain in the optical waveguide, and a second value $F_2$ that is indicative of the optical frequency of the tunable laser at which the light thereof experiences an SBS induced loss in the optical waveguide; and,
providing said first and second values of the optical frequency of the tunable laser for referencing changes in the optical frequency of the tunable laser to the SBS frequency shift $v_B$, or a multiple thereof.

17. The method of claim 16, further comprising re-calibrating the optical frequency of the tunable laser so that a difference between the first and second values of the optical frequency of the tunable laser is equal to $2v_B$.

18. The method of claim 16, wherein the step of sweeping the optical frequency of the tunable laser is preceded by the steps of:
i) selecting the frequency range of the sweeping so as to define lower and upper boundaries thereof, and
ii) adjusting the optical frequency of the reference laser so that it lies within the selected frequency range of the sweeping at a distance of at least $v_B$ from each of the lower and upper boundaries of the selected frequency range.

19. The method of claim 16, wherein the step of recording comprises:
converting a portion of the first or second light that experienced the SBS in the optical waveguide into an electrical signal with a photodetector,
detecting positive and negative peaks in the electrical signal during the sweeping, and
determining the first and second values F1, F2 from timings of the detected positive and negative peaks during the sweeping.

20. The method of claim 16, wherein the step of recording comprises:
generating a difference signal that is proportional to a difference between optical powers of the first and second light after their propagation through the optical waveguide; and,
determining the first and second values F1, F2 from the timing of peaks in the difference signal during the sweeping.

* * * * *